Dec. 15, 1953     R. S. RICE     2,662,343
PAVEMENT PROVIDING FOR PLANT GROWTH
Filed June 30, 1950
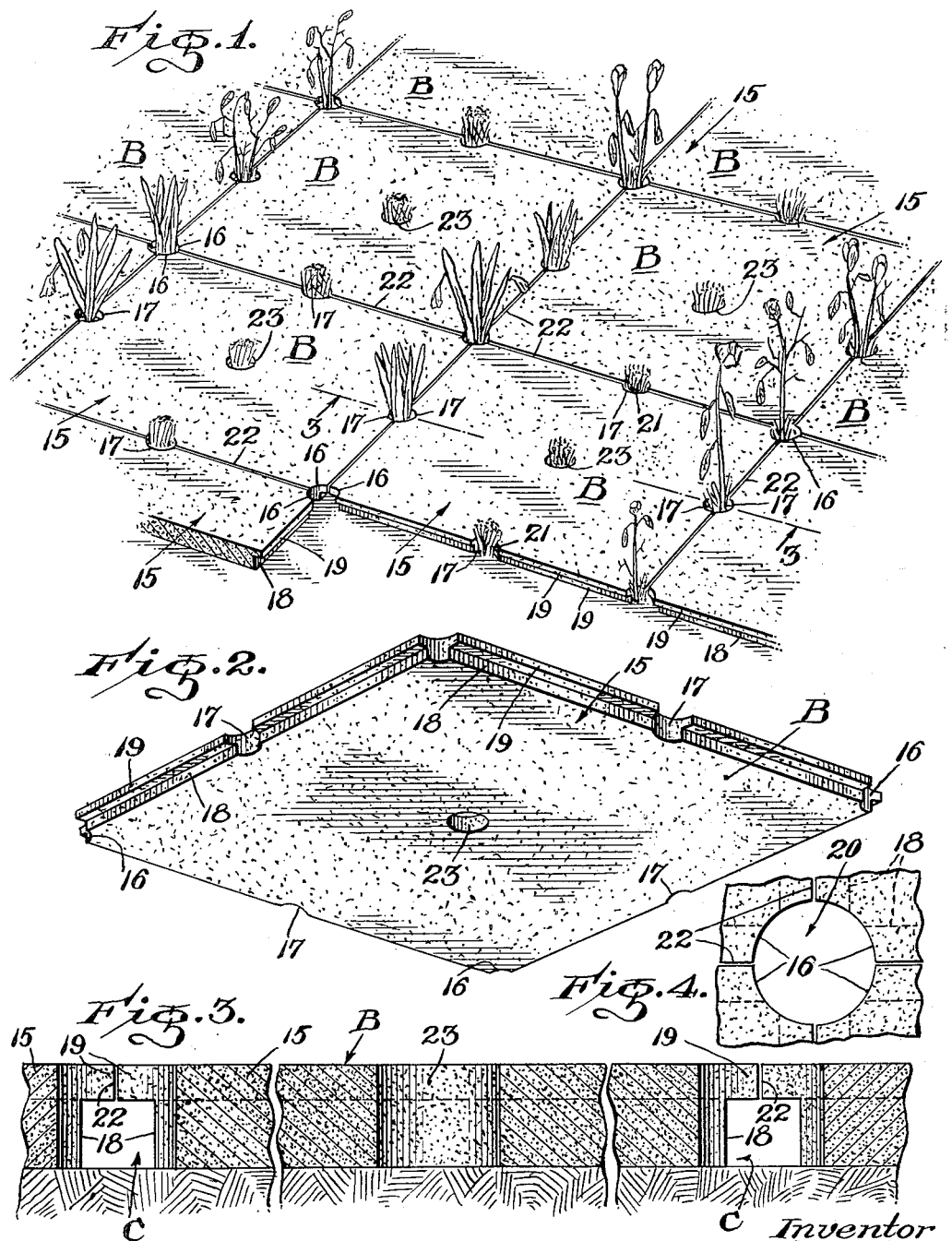
Inventor
Robert S. Rice
BY
Attorney.

UNITED STATES PATENT OFFICE 2,662,343

PAVEMENT PROVIDING FOR PLANT GROWTH

Robert S. Rice, Los Angeles, Calif.

Application June 30, 1950, Serial No. 171,453

1 Claim. (Cl. 47—33)

My invention relates to pavements for patios, yards or walks made of blocks of stone, brick, concrete or the like. The beauty of such pavements can be greatly enhanced by growing trees, plants or flowers thereon, but the blocks of present day construction prevent the planting and growing of such plant life.

Accordingly, it is a purpose of my invention to provide a pavement made up of blocks of any suitable material, but so constructed as to afford the planting and the successful growing of trees, plants or flowers within the area defined by the pavement.

It is also a purpose of my invention to provide a pavement in which the construction of the blocks is such as to form openings in which the trees, plants or flowers may be planted, and channels between the blocks permitting irrigation to promote growth of the trees, etc.

I will describe only one form of pavement, and one form of block, each embodying my invention, and will then point out the novel features thereof in the claim.

In the accompanying drawings:

Fig. 1 is a fragmentary plan view showing in perspective one form of pavement embodying my invention.

Fig. 2 is an enlarged detail view showing in bottom perspective one of the blocks comprising the pavement of Fig. 1.

Fig. 3 is an enlarged sectional view broken on the line 3—3 of Fig. 1.

Fig. 4 is an enlarged fragmentary plan view taken at one of the corners of four adjacent blocks of pavement.

Referring specifically to the drawings, the pavement embodying my invention comprises a plurality of blocks B of identical construction, each comprising a flat body 15 of angular form which may be made of concrete, brick, tile or any other suitable material of appropriate thickness and area.

In the present instance each block body is of quadrangular form and at each of the four corners it is formed with recesses 16, each of quadrantal shape and extending from top to bottom of the body. Also, provided in all four edges of the body is at least one semicircular recess 17 which, in the present case, is located medially of the corners of the body.

All edges of the block body 15 are undercut as indicated at 18 and in such manner that flanges 19 are formed at the top of such edges which are coplanar with the top surface of the body as best shown in Fig. 3. These flanges 19 are coextensive in length with the body edges except where the recesses 16 and 17 are formed.

In constructing a pavement of blocks B made in accordance with my invention they are laid on the ground edge to edge in the manner illustrated in Fig. 1 with the flanges 19 uppermost and coplanar one with the other, leaving the undercut portion 18 at the lower side of the blocks as illustrated in Figs. 1 and 3. Thus the confronting flanges of adjacent blocks serve to bridge in part the undercut portions 18 therebeneath and so that they coact with the ground to form channels C between the blocks.

Also the blocks are laid so that the corner recesses 16 of any four adjacent blocks are brought in confronting relation to form a circular opening 20 between the corners. Similarly, the semicircular recesses 17 of adjacent blocks are brought into registration to form circular openings 21 between the block edges.

Since the undercut portions 18 extend from one opening 20 or 21 to the other around all four edges of any one block, the channels C do likewise to place the openings in connection with each other. It is to be noted that the confronting flanges 19 are slightly spaced apart to leave a crevice 22 therebetween through which water for plant irrigation purposes may find its way downwardly into the channels.

With the blocks laid as described a pavement is provided in which one is enabled to plant small trees, flowers or the like in each of the openings 20 and 21, since the ground therebeneath is accessible for such planting. Because the openings are arranged in intersecting rows a symmetrical arrangement of whatever plant life is planted results.

Successful growing of the plant life and particularly flowers, is fostered since proper irrigation thereof can be effected and maintained. All that is necessary is to pour or spray water on the pavement when it passes through the crevices 22 and into the channels C where it is distributed to all of the openings and thence to the plants.

To further the intersecting row arrangement of the plants the blocks may each be provided at its center with an opening 23 in which an artificial flower or other plant may be placed, or a live plant requiring little water such as a cactus plant.

Although I have herein shown and described only one form of pavement, and one form of block for making the pavement, it is to be undestood that various changes and modifications may be made herein without departing from the spirit of my invention and the spirit and scope of the appended claim.

What I claim is:

A pavement comprising a plurality of rigid paving blocks arranged in rows disposed in side-by-side relation to each other, said blocks being of geometric outline and disposed in edge-by-edge relation to each other, each block being a rigid slab of even thickness throughout substantially its entire area and having flat upper and lower surfaces, marginal edges of the slab being formed with outwardly extending upper portions constituting flanges flush with the upper surface of the slab and spaced upwardly from the lower surface of the slab and defining marginal recesses under the flanges, each recess extending the full length of the flange under which it is located, the flanges along meeting edges of adjoining blocks of the pavement being in close proximity to each other and the recesses under the flanges of confronting side edges of adjoining blocks cooperating with each other and forming unobstructed water-receiving channels each extending the full length of a row of blocks, and corners of the blocks being formed with recesses extending the full thickness of a block, the said corner recesses of the blocks of adjoining rows registering with each other and forming continuous vertically disposed plant-receiving openings extending entirely through the pavement the full depth of the water-receiving channels and of a cross sectional dimension not less than the width of the water-receiving channels and connected with each other by the said water-receiving channels.

ROBERT S. RICE.

References Cited in the file of this patent

UNITED STATES PATENTS

| Number | Name | Date |
|---|---|---|
| 80,012 | Robbins | July 14, 1868 |
| 350,101 | Bates | Oct. 5, 1886 |
| 420,020 | Schreyer | Jan. 21, 1890 |
| 511,870 | Winter | Jan. 2, 1894 |
| 572,762 | Landers | Dec. 8, 1896 |
| 2,215,159 | Rothmann | Sept. 17, 1940 |

FOREIGN PATENTS

| Number | Country | Date |
|---|---|---|
| 7,278 | Switzerland | Aug. 19, 1893 |
| 9,487 | Great Britain | June 19, 1890 |
| 478,349 | Great Britain | Jan. 18, 1938 |